US011194571B2

(12) United States Patent
Nakazawa

(10) Patent No.: US 11,194,571 B2
(45) Date of Patent: Dec. 7, 2021

(54) MANAGEMENT SYSTEM AND METHOD FOR CONTROLLING SAME, AND STORAGE MEDIUM

(71) Applicant: CANON KABUSHIKI KAISHA, Tokyo (JP)

(72) Inventor: Toshiyuki Nakazawa, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/010,280

(22) Filed: Sep. 2, 2020

(65) Prior Publication Data

US 2021/0072978 A1 Mar. 11, 2021

(30) Foreign Application Priority Data

Sep. 6, 2019 (JP) .............................. JP2019-163276

(51) Int. Cl.
*G06F 9/44* (2018.01)
*G06F 8/70* (2018.01)
*G06F 12/0802* (2016.01)

(52) U.S. Cl.
CPC ............ *G06F 8/70* (2013.01); *G06F 12/0802* (2013.01); *G06F 2212/60* (2013.01)

(58) Field of Classification Search
CPC ....................................................... G06F 9/44
See application file for complete search history.

(56) References Cited

U.S. PATENT DOCUMENTS 6,324,565 B1 * 11/2001 Holt, III .............. G06F 16/9574
709/203
8,234,348 B1 * 7/2012 Tulchinsky ......... H04L 67/2842
709/214

FOREIGN PATENT DOCUMENTS

JP 2009140115 A * 6/2009
JP 2009140115 A   6/2009

* cited by examiner

*Primary Examiner* — Jae U Jeon
(74) *Attorney, Agent, or Firm* — Rossi, Kimms & McDowell LLP

(57) ABSTRACT

An agent comprises: a transmission unit configured to transmit location information to a device based on an instruction from a manager; a cache unit configured to cache software; and a determination unit configured to determine, when an obtainment request for software is received from a device, whether the software corresponding to the location information indicated in the obtainment request is cached. The agent further comprises: a first distribution unit configured to distribute, in a case where the software is cached, the software cached in the cache unit to the device; and a second distribution unit configured to obtain, in a case where the software is not cached, the software based on the location information indicated in the obtainment request, cause the cache unit to cache the software, and distribute the software to the device.

8 Claims, 9 Drawing Sheets

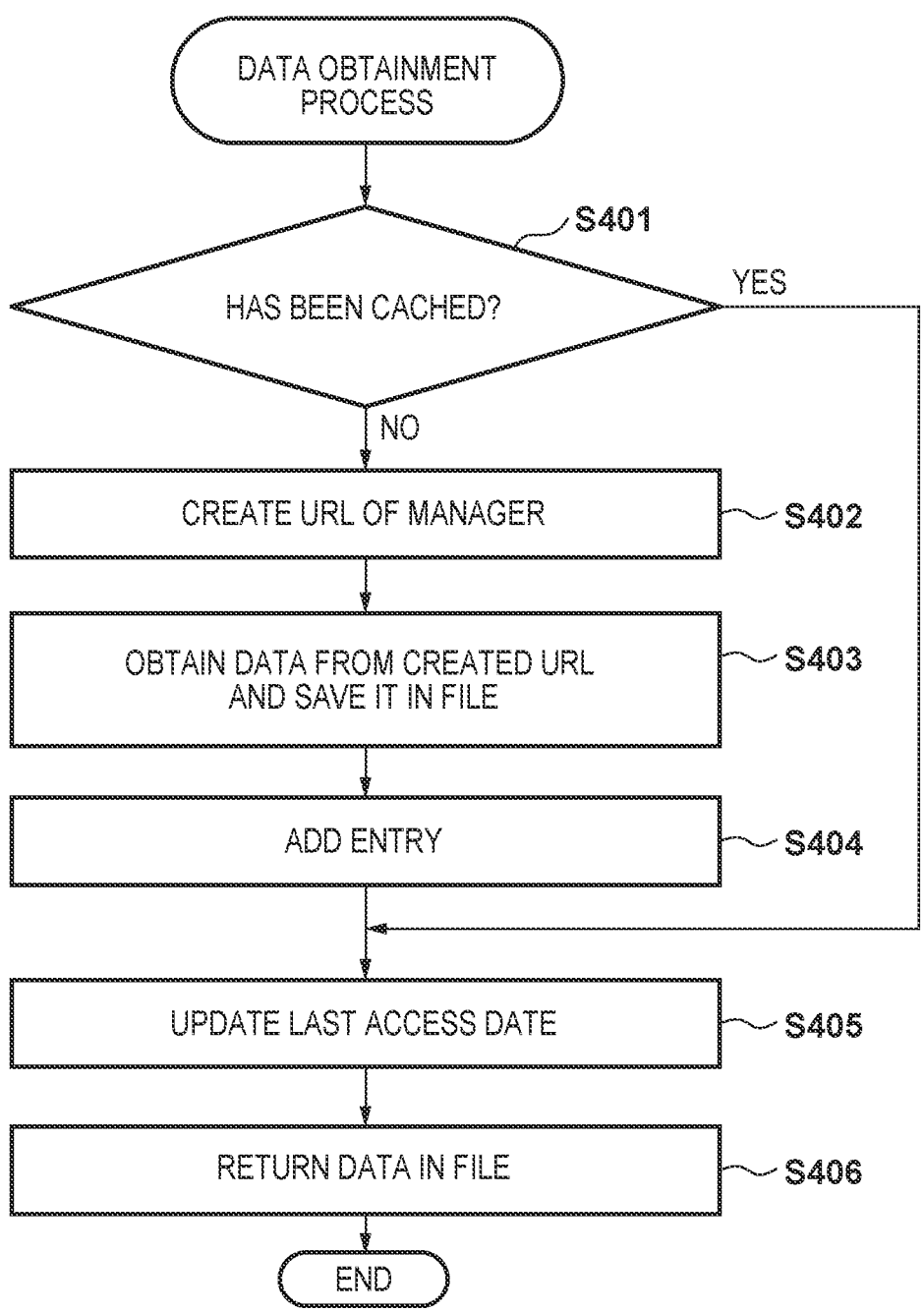

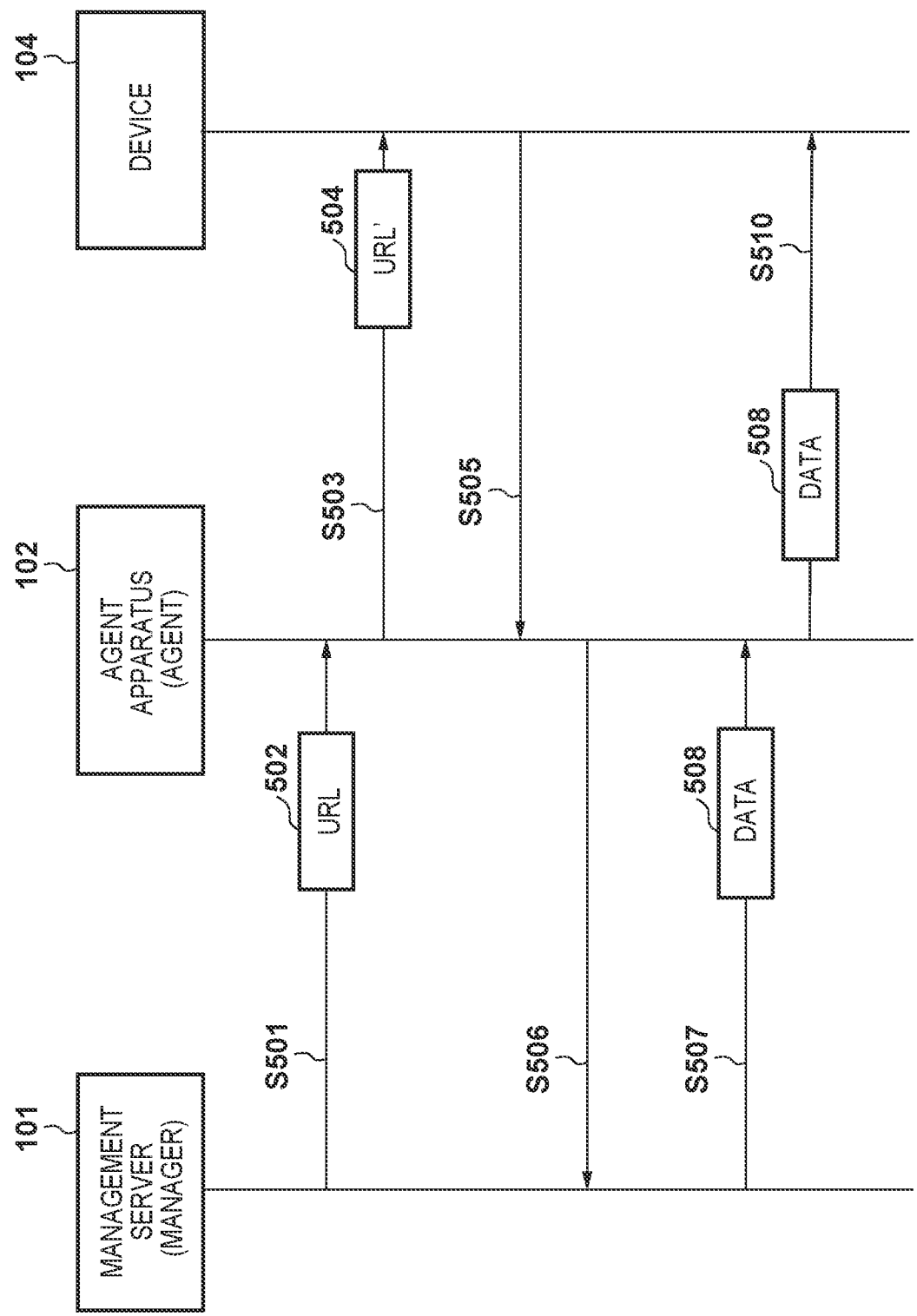

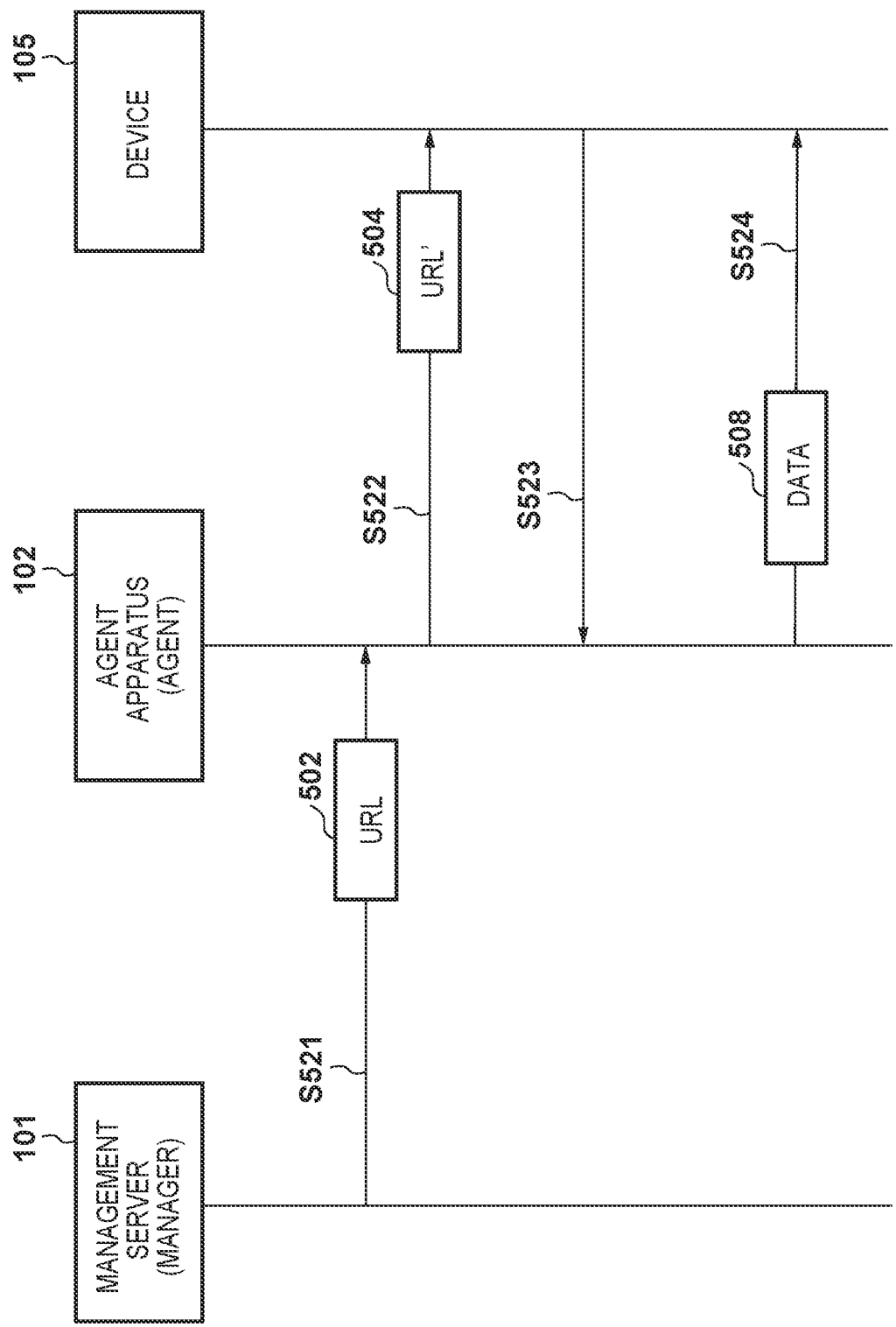

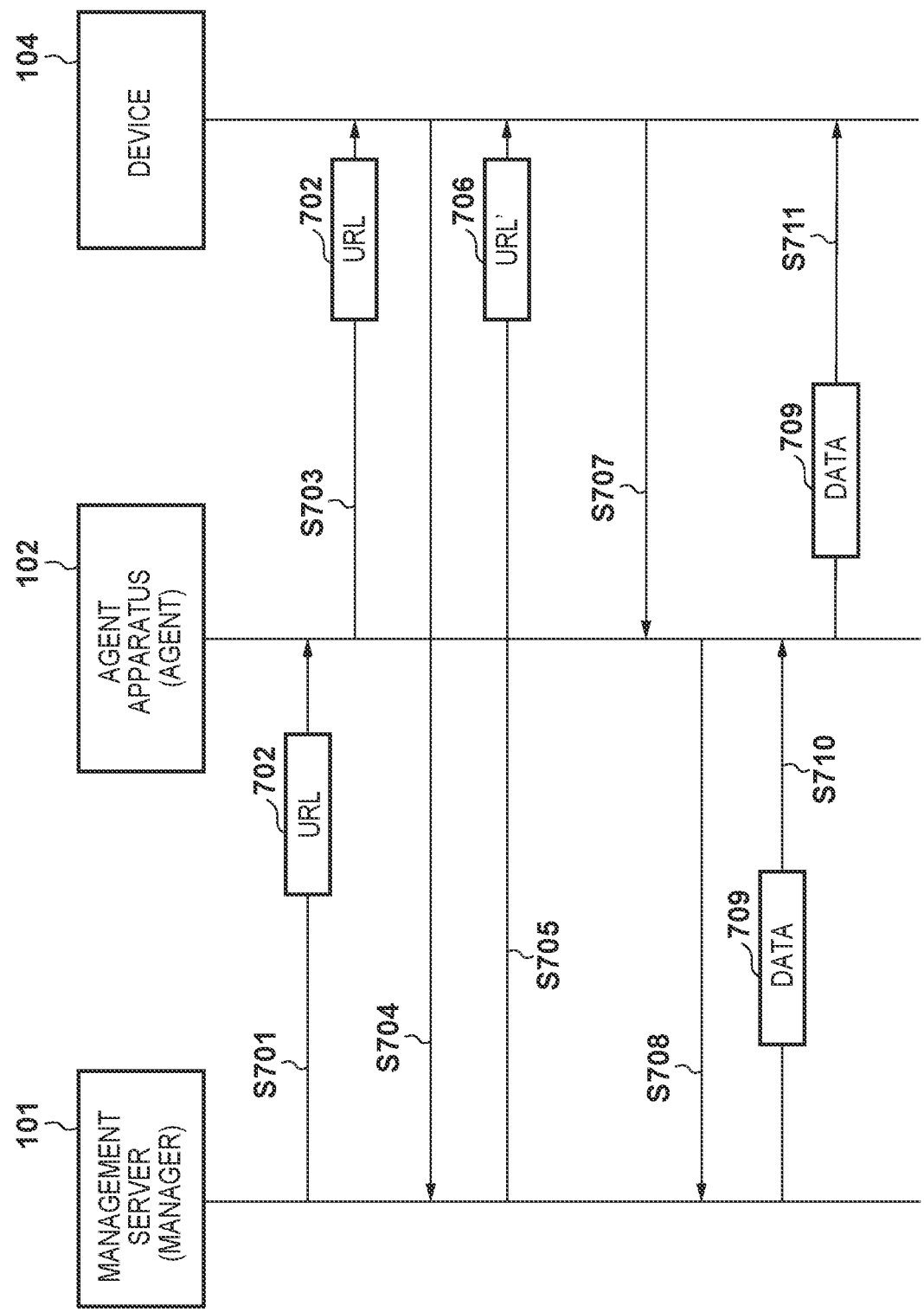

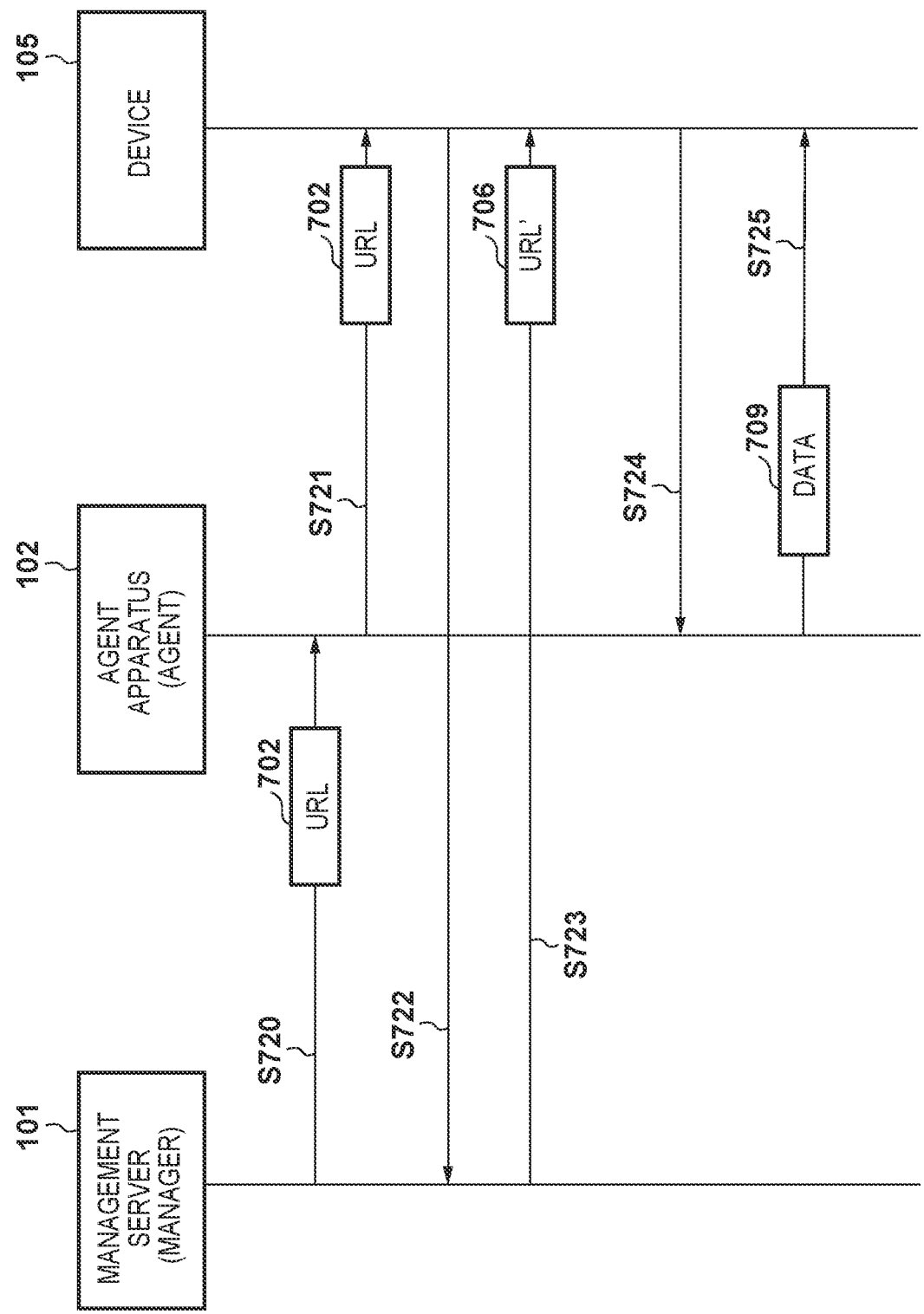

MANAGEMENT SYSTEM AND METHOD FOR CONTROLLING SAME, AND STORAGE MEDIUM

BACKGROUND OF THE INVENTION

Field of the Invention

The present invention relates to a management system and a method for controlling the management system, and a storage medium.

Description of the Related Art

A management system is known that manages a plurality of image forming apparatuses (hereinafter referred to as devices) connected via a network. The management system, for example, uses communications according to various protocols to obtain information from the devices or instruct the devices to execute processing. In a case where an application is installed on the device or firmware of the device is updated, instead of transmitting the application or the firmware to the device, an instruction related to an address for obtaining the application or the firmware may be given to the device. In this case, the device obtains the content from the specified address.

Additionally, an example of a technique for preventing accesses of a plurality of clients from concentrating on a WEB server is a method in Japanese Patent Laid-Open No. 2009-140115 (PTL 1). In PTL 1, a relay server instructs a content cache server to cache a content, and replaces, for the client, location information regarding the content on the WEB server with the location information on the cache server.

In a case where a large number of devices are managed, the device management system may be constituted of a single management server (manager) that manages the entire management and a plurality of agents that execute processing on the devices in accordance with instructions from the management server. In a case where obtainment processing for the application or the firmware is performed in such a configuration, there is a problem in that accesses from the devices concentrate on the management server.

In a case where the relay server is used as in PTL 1 to avoid concentration of accesses on the management server, the relay server needs to preemptively instruct the cache server to cache the content. Additionally, the relay server needs to preemptively know the configuration and address of the cache server, and there is a problem that the configuration and control becomes complicated.

SUMMARY OF THE INVENTION

According to one aspect of the present invention, a management system comprising a manager configured to manage software and an agent configured to communicate with one or more devices via a network based on an instruction from the manager, wherein the manager comprises: an instruction unit configured to give the agent an instruction to transmit, to a device, location information for obtaining software, and the agent comprises: a transmission unit configured to transmit the location information to the device based on the instruction from the manager; a cache unit configured to cache the software; a determination unit configured to determine, when an obtainment request for the software is received from the device, whether the software corresponding to the location information indicated in the obtainment request is cached in the cache unit or not; a first distribution unit configured to distribute, in a case where the determination unit determines that the software is cached, the software cached in the cache unit to the device; and a second distribution unit configured to obtain, in a case where the determination unit determines that the software is not cached, the software based on the location information indicated in the obtainment request, cause the cache unit to cache the software, and distribute the software to the device.

The present invention avoids concentration of accesses on a manager when executing obtainment processing for an application or firmware.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 4 is a flowchart of a data obtainment processing according to the present invention.

FIG. 5A is a sequence diagram of application installation processing according to the first embodiment.

FIG. 5B is a sequence diagram of application installation processing (application being cached) according to the first embodiment.

FIG. 7A is a sequence diagram of firmware update processing according to the second embodiment.

FIG. 7B is a sequence diagram of firmware update processing (firmware being cached) according to the second embodiment.

DESCRIPTION OF THE EMBODIMENTS

Figure 1:
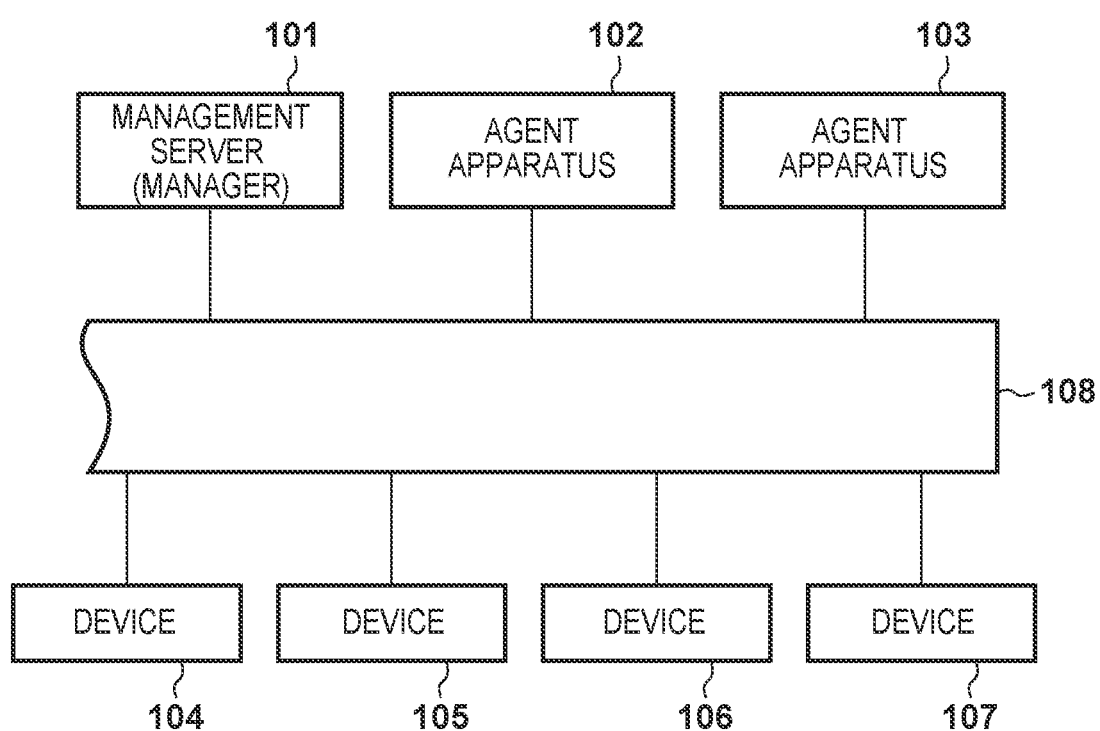
FIG. 1 illustrates an example of an overall configuration of a system according to an embodiment of the present disclosure.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

System Configuration

FIG. 1 is a diagram illustrating an example of an overall configuration of a network system that includes a manager/agent system according to the present embodiment. The network system functions as a management system for devices and includes one management server (hereinafter, referred to as a "manager") 101 and a plurality of agent apparatuses (hereinafter "agents") 102 and 103. The manager 101 manages network devices (hereinafter referred to as "devices") 104 to 107. The manager 101, the agents 102 and 103, and the devices 104 to 107 are mutually communicatively connected together by a network 108.

The manager 101 is an apparatus implemented by installing a device management application on an information processing apparatus. An agent is an apparatus that is implemented by installing a device agent application on an information processing apparatus. By installing both a device management application and a device agent application on one information processing apparatus, an agent function can be implemented in the apparatus in addition to a manager function. In such a case, the manager manages a plurality of devices via an agent in the apparatus itself and one or more agents that are implemented in another apparatus on the network.

In the following description, the agent 102 is assumed to monitor devices 104 and 105, and the agent 103 is assumed to monitor devices 106 and 107. Specific descriptions will be given below using the agent 102 as a representative of the agents and using the device 104 as a representative of the devices. Note that other agents and devices are assumed to perform equivalent operations.

The manager 101 instructs the agent 102 to perform an operation on the device 104. In accordance with the instruction from the manager 101, the agent 102 executes processing such as transmission of a request to the device 104, and transmits the processing result to the manager 101. An example of processing by the agent 102 includes obtainment of device information and operation information from the device 104. Other examples include a change in setting values for the device 104, an instruction to install an application on the device 104, and the like.

FIG. 1 illustrates a configuration with two agents and four devices to be managed, but these numbers are illustrative and may be increased or decreased. Thus, even in a case where tens of thousands of devices are managed via a dozen agents, the configuration and operation of the apparatus are the same as those described below.

Additionally, the configuration of the network 108 that communicatively connects devices together is not particularly limited. Note that the network 108 may include a combination of the Internet, a Local Area Network (LAN), a Wide Area Network (WAN), and the like and that any communication standards may be used and that the network may be wired or wireless.

Hardware Configuration

Figure 2:
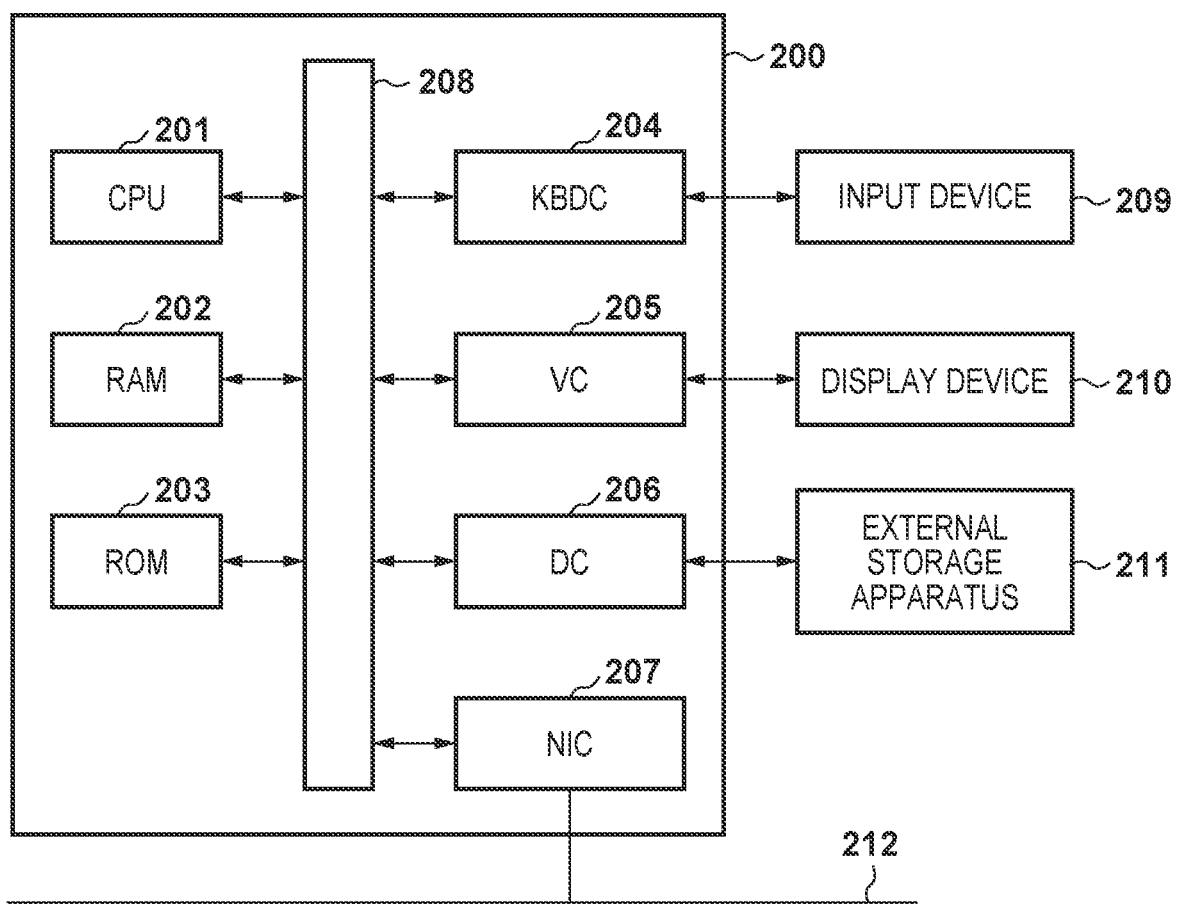
FIG. 2 illustrates an example of a hardware configuration of an information processing apparatus according to the present invention.

FIG. 2 illustrates an example of a hardware configuration of an information processing apparatus that can operate as the manager 101 or the agent 102 or 103 according to the present embodiment. The information processing apparatus 200 includes a CPU 201, a RAM 202, a ROM 203, a KBDC 204, a VC 205, a DC 206, and an NIC 207. The CPU 201 collectively controls each units connected via the system bus 208. The CPU 201 implements various functions by executing software (programs), stored in the ROM 203 or external storage apparatus 211 or downloaded via a network 212, with loading the software to RAM 202 as appropriate.

The RAM 202 is a volatile storage area and functions as a main memory or a work area for the CPU 201. The external storage apparatus 211 is constituted of a hard disk (HD), a solid state drive (SSD), or the like. The external storage apparatus 211 stores various applications including a boot program, an operating system (OS), an authentication server, an authentication client, and the like, and database data, user files, and the like. As described above, in the present embodiment, the CPU 201 of information processing apparatus 200 operating as the manager 101 executes a device management application program. In addition, the CPU 201 of the information processing apparatus 200 operating as the agent 102 or 103 executes an agent application program.

The KBDC 204 is a keyboard controller, and sends, to the CPU 201, input information from the input device 209 such as a keyboard or a pointing device. The VC 205 is a video controller, and controls display of the display device 210 constituted of an LCD or the like. The DC 206 is a disk controller and controls accesses to and from the external storage apparatus 211. The NIC 207 is a communication controller and is connected to the network 212 to control communication with external apparatuses. Note that the configuration of the information processing apparatus illustrated in FIG. 2 is an example and that the information processing apparatus in which the manager 101 operates and the information processing apparatus in which the agent 102 operates have different configurations.

Software Configuration

Figure 3:
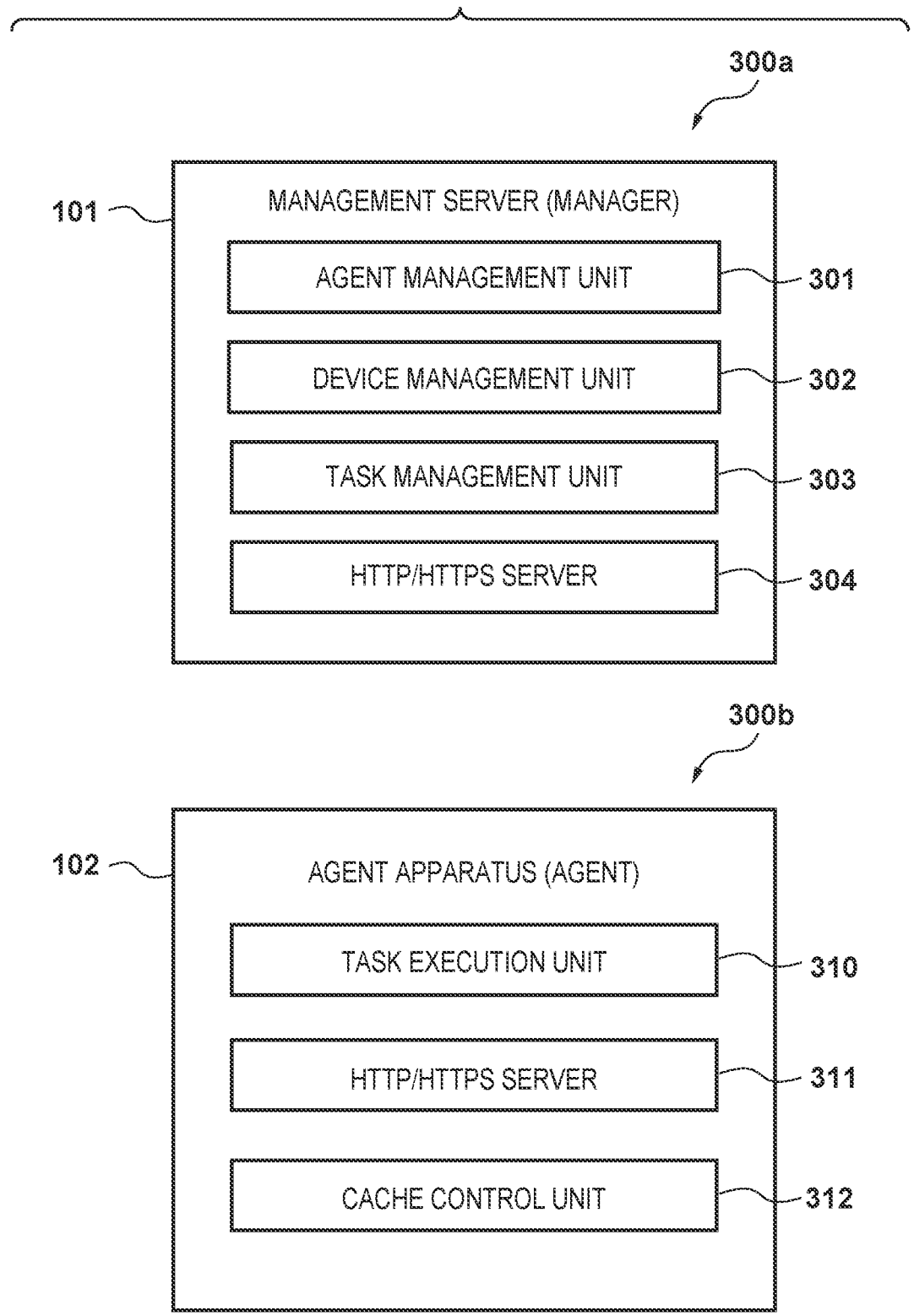
FIG. 3 illustrates examples of software configurations of a manager and an agent according to the present invention.

A configuration 300a in FIG. 3 is a diagram illustrating an example of a software configuration of the manager 101 according to the present embodiment. In the present embodiment, the information processing apparatus 200 operating as the manager 101 reads and executes the program of the device management application to implement the functions of each unit. An agent management unit 301 manages information related to the agents 102 and 103. The device management unit 302 manages information related to the devices 104 to 107 to be managed. Information related to the devices includes information regarding a correspondence relationship between the device and the agent. A task management unit 303 manages the contents and results of processing on the device, and instructs the agents to execute processing on the devices. The management information is stored in a database (not illustrated). Additionally, the manager 101 is assumed to hold, in the external storage apparatus 211, the program data of the application that can be provided to each device, and manages the corresponding location information (stored destination) and the like. An HTTP/HTTPS server 304 uses HTTP or HTTPS communication to receive a request from the agent or the device or provide a WEB UI to allow the user to operate the manager 101.

A configuration 300b in FIG. 3 is a diagram illustrating an example of a software configuration of the agent 102 according to the present embodiment. In this embodiment, the information processing apparatus 200 operating as the agent 102 implements the functions of each unit by reading and executing the program of the device agent application. A task execution unit 310 executes processing on the device 104 in accordance with an instruction from the manager 101, and then transmits the processing result to the manager 101. An HTTP/HTTPS server 311 uses HTTP and HTTPS communication to receive requests from the manager 101 and the device 104. A cache control unit 312 provides a caching function for contents in the manager 101.

Data Acquisition Processing

FIG. 4 is a flowchart illustrating a flow of data obtainment processing executed by the cache control unit 312 included in the agent 102 illustrated in the configuration 300b. When the HTTP/HTTPS server 311 receives a GET request with a path starting with a specific character string (e.g., "/cache)"), the data obtainment processing is invoked using the path as an argument. An example of the path is illustrated below.

/cache/application/ocr.jar
/cache/firmwares/4cb89c08-76a4-4caa-8c9d-2aa1021faac5

Additionally, in the present embodiment, the agent 102 manages data using a table structure indicated in Table 1 below.

TABLE 1

| Path | File Name | Last Access Date and Time | Content Type |
|---|---|---|---|
| /cache/applications/ocr.jar | b60514a3-b98b | 2019 May 23 10:28:34 | application/octet-string |
| /cache/applications/ocr.jar | 9a6e6e2f-1d6a | 2019 May 23 10:32:42 | application/octet-string |

In the table illustrated in Table 1, the path indicates a path provided using the argument, i.e., a path specified in the GET request received by the HTTP/HTTPS server 311. The file name indicates the file name of a file when data indicated by the path is obtained and saved in the agent 102. The last access date and time indicates the date and time at which the data obtainment processing is invoked using the path as an argument. The content type is a character string indicating the type of data.

In S401, the cache control unit 312 checks whether the data indicated by the path provided using the argument is cached or not. Here, the table illustrated in Table 1 is referenced, and the presence of the path provided using the argument is determined to indicate that the data is cached, whereas the absence of the path is determined to indicate that the data is not cached yet. In a case where the requested data is cached (YES in S401), then the processing proceeds to S405. In a case where the requested data is not cached (NO in S401), then the processing proceeds to S402.

In S402, the cache control unit 312 creates a Uniform Resource Locator (URL) of the manager 101 corresponding to the requested path. For example, in a case where the requested path is "/cache/application/sso.jar", the path created is "/public/applications/sso.jar". In this way, a portion of the requested path character string (cache) is replaced with another character string (public).

In S403, the cache control unit 312 transmits the HTTP or HTTPS GET request for the URL created in S402 to the HTTP/HTTPS server 304 of the manager 101 via the HTTP/HTTPS server 311. The cache control unit 312 saves, in the file, data included in a response to the request.

In S404, the cache control unit 312 adds, to the table illustrated in Table 1, an entry related to the data obtained from the manager 101. In the addition in this case, a content type is set to be the content type indicated in the HTTP header in the response from HTTP/HTTPS server 304 in the manager 101.

In S405, the cache control unit 312 updates, with the current date and time, the value of the last access date and time in the table illustrated in Table 1.

In S406, the cache control unit 312 returns, to the HTTP/HTTPS server 311, the data of the file indicated by the file name in the table illustrated in Table 1, and the content type. At this time, the HTTP/HTTPS server 311 sets the value for the content type in the HTTP header of the response to the device and also sets the corresponding data in the body of the response. Subsequently, the HTTP/HTTPS server 311 returns the response to the invocation source (device) of the GET request.

Processing Sequence
Pre-Cache

FIG. 5A is a sequence diagram illustrating a flow of processing executed when the manager 101 instructs the device 104 associated with the agent 102 to install an application. It is assumed that, at the start of the present processing sequence, the agent 102 has not cached the data of the application to be installed. Additionally, the IP addresses of the manager 101 and the agent 102 are respectively assumed to be "192.168.10.100" and "192.168.10.200".

First, the manager 101 transmits, to the HTTP/HTTPS server 311 of the agent 102, a request that includes an instruction to the device 104 to install the application (S501). The instruction in this case includes a URL 502 (e.g., "http://192.168.10.100/public/applications/ocr.jar") for allowing the device 104 to obtain the application. The URL in this case indicates the stored destination of program data of the application managed by the manager 101.

In response to receipt of a request from the manager 101, the HTTP/HTTPS server 311 of the agent 102 invokes the task execution unit 310 to execute the requested processing. The task execution unit 310 replaces the URL 502 included in the request with a URL 504 for a cache of the agent 102 (e.g., "http://192.168.10.200/cache/applications/ocr.jar"). Here, in a case where the manager 101 and the agent 102 are operating in the same information processing apparatus, the above-described replacement is not performed. The case of operating in the same information processing apparatus corresponds to a case where, i.e., a host address portion of the URL 502 (corresponding to the IP address portion of the URL described above) is the same as the address of the host on which the agent 102 operates.

Next, the task execution unit 310 transmits a request to the device 104 (S503). The request in this case includes an instruction for the device 104 to use the URL 504, replaced URL, to obtain and install the application.

The device 104 receives the request from the agent 102 and then transmits an obtainment request for obtainment of the application to the URL 504 for the agent 102 included in the request (S505).

In response to receipt of the obtainment request from the device 104, the HTTP/HTTPS server 311 of the agent 102 invokes the data obtainment processing described with reference to FIG. 4. Because, at this point, the agent 103 has not cached the data indicated at the URL 504, the agent 103 transmits a request for obtainment of the application to the URL of the manager 101 (S506) in accordance with the processing illustrated in FIG. 4. Here, the URL generated in S402 in FIG. 4 is the same as the URL 502.

The HTTP/HTTPS server 304 of the manager 101 returns, to the agent 102, data 508 requested using the URL (S507).

The cache control unit 312 of the agent 102 caches the data 508 obtained from the manager 101 in accordance with the processing described in FIG. 4. Furthermore, the HTTP/HTTPS server 311 of the agent 102 replies with the cached data 508 to the device 104 to distribute the software (S510). Subsequently, the device 104 installs the application using the data 508 received from the agent 102. Then, the present processing sequence is terminated. Note that, in a case where the manager 101 and the agent 102 operate on the same information processing apparatus, the caching operation for the software may be omitted in the agent 101. For example, before the start of the processing in FIG. 4, the information processing device may be identified in which each of the manager 101 and the agent 102 operates, and in accordance with the identification result, the contents of the processing in FIG. 4 may be modified. Specifically, instead of the processing in FIG. 4, the agent 102 may execute processing of transferring, directly to the device 104, the data of the software obtained from the manager 101.

Post-Cache

FIG. 5B is a sequence diagram illustrating a flow of processing executed when, after the processing illustrated in FIG. 5A, the manager 101 instructs the device 105 associated with the agent 102 to install the same application. At the start of the present processing sequence, the agent 102 is caching the data of the application as a result of the processing illustrated in FIG. 5A.

Processing from S521 to S523 is similar to S501 to S505 in FIG. 5A, and thus description of the processing is omitted. The URL specified in the request transmitted from the device 105 in S523 in FIG. 5B is the same as the URL (URL 504) in the request in S505 in FIG. 5A. The HTTP/HTTPS server 311 of the agent 102 receives the request and then invokes the data obtainment processing described with reference to FIG. 4. Here, the data 508 corresponding to the URL 504 has already been cached in the agent 102 by the processing from S506 to S507 in FIG. 5A.

The cache control unit 312 of the agent 102 causes the HTTP/HTTPS server 311 to reply with the cached data 508 to the device 105 (S504). Subsequently, the device 105 installs the application using the data 508 received from the agent 102. Then, the present processing sequence is terminated.

In FIGS. 5A and 5B, the HTTP is used for communication between the manager 101 and the agent 102 and communication between the agent 102 and the devices 104 and 105. The HTTPS may be used for both communications. Alternatively, the HTTPS may be used for the communication between the manager 101 and the agent 102, whereas the HTTP may be used for the communication between the agent 102 and the device 104. In this case, protocol portions of the URL 502 and the URL 504 are both "http". However, the URL generated by the cache control unit 312 of the agent 102 in S402 in FIG. 4 corresponds to the URL 502 with the protocol portion replaced with "https". Additionally, another protocol (e.g., File Transfer Protocol (FTP)) may be used for communication.

In FIGS. 5A and 5B, the agent 102 processes the replacement of the URL to allow the device 104 or 105 to obtain the application. This replacement processing may be performed by the manager 101. In this case, first, the manager 101 obtains the host address of the agent 102 associated with the device 104. Then, the URL 502 used to obtain the data of the application from the manager 101 is replaced with the URL 504 used to obtain the cache of the agent 102. In this case as well, in a case where the agent 102 and manager 101 operate on the same host, the above-described replacement is not performed. The manager 101 transmits the URL 504 to the agent 102 in S501 in FIG. 5A and in S521 in FIG. 5B. In this case, the agent 102 does not replace the URL and transmits the URL to the devices 104 and 105 in S503 in FIG. 5A and in S522 in FIG. 5B. Subsequently, in a case where, when the agent 102 receives a software obtainment request from the device based on the URL 504, the corresponding software is not cached, the agent 102 converts the URL 504 to the URL 502 of manager 101. Then, the agent 102 uses the URL 502 to obtain the software. The subsequent processing is similar to that described above, and thus description of the processing is omitted.

The agent 102 may execute processing to periodically maintain cache management information in the table illustrated in Table 1. For example, entries, which have been registered in the table and a certain amount of time have passed after registration, and the corresponding data may be deleted. Specifically, for each entry for which the difference between the last access date and time and the current date and time has a specified value or larger (e.g., 24 hours), processing may be executed that involves deleting a file in the agent 102 indicated by the file path of the entry and deleting the corresponding entry in Table 1.

As described above, in the present embodiment, a software caching function is provided for the agent. This enables avoidance of concentration of accesses on the manager to lighten the burden on the manager when an application or firmware is obtained.

Second Embodiment

Recent devices have enlarged firmware sizes, and when the firmware of the device is updated, transfer of the whole firmware involves many communication loads associated with data transfer. To avoid this, the device may transmit, to the server, information regarding the current firmware of the device itself, and the server may reply with an address for obtaining a differential file needed to update the firmware.

In the present embodiment, a form will be described that includes, in addition to the configuration of the first embodiment, a firmware updating function of the network device. Hereinafter, the same reference signs are used for the same components as those in the first embodiment, and differences from the first embodiment will be mainly described.

Figure 6:
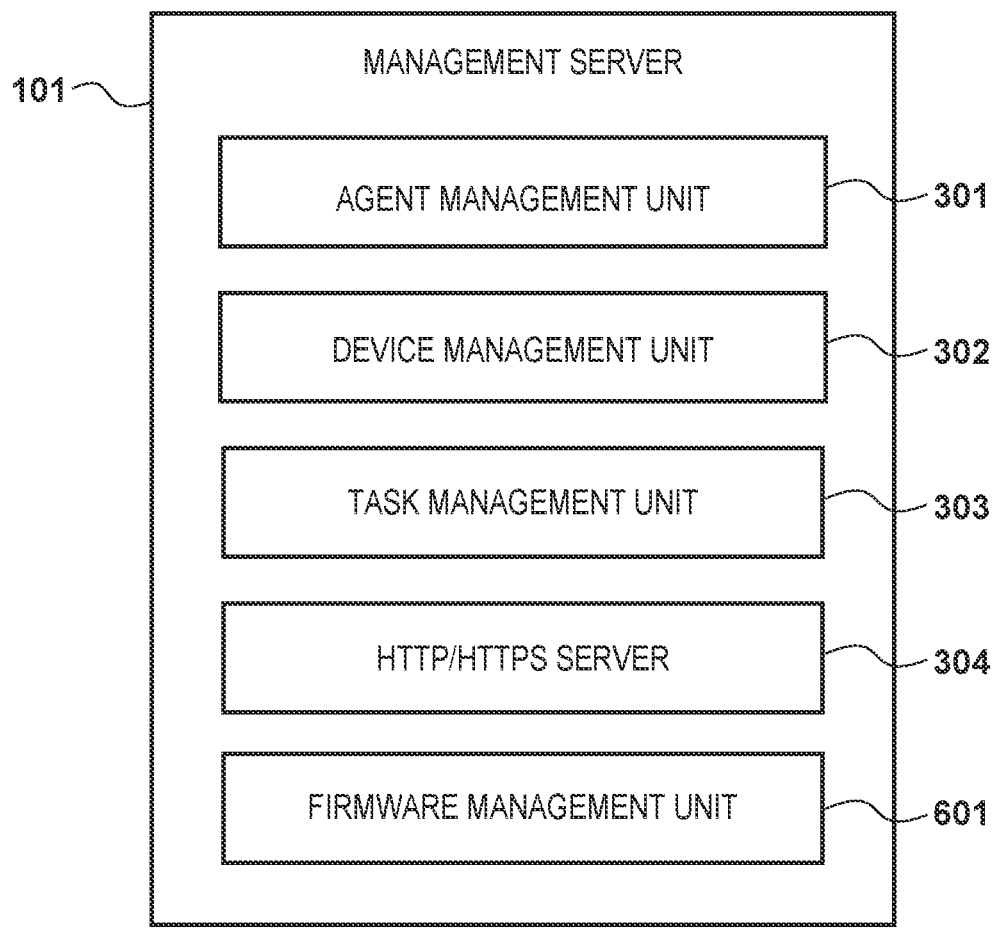
FIG. 6 illustrates an example of a software configuration of a manager according to a second invention.

FIG. 6 illustrates an example of a software configuration of the manager 101 according to the present invention. As a difference from the configuration described using the configuration 300a in FIG. 3 according to the first embodiment, a firmware management unit 601 is further provided.

The firmware management unit 601 manages firmware for the devices. The HTTP/HTTPS server 304 invokes the firmware management unit 601 according to the URL indicated in the request. The firmware management unit 601 holds and manages information regarding the firmware for various devices. Additionally, the manager 101 is assumed to hold and manage, in the external storage apparatus 211, program data of the firmware that can be provided to each device. The firmware management unit 601 provides a firmware updating function in response to a request received from the device via the HTTP/HTTPS server 304. At this time, the request from the device includes product information regarding the device and version information regarding the firmware. The firmware management unit 601 replies with the address (URL) for obtaining data needed to update the firmware for the device based on the product information and the version information in the request. The device transmits an HTTP/HTTPS request to the address obtained from the manager 101, to receive the data needed to update the firmware, and updates the firmware by the device itself.

Processing Sequence

Pre-Cache

FIG. 7A is a sequence diagram illustrating a flow of processing executed when the manager 101 instructs the device 104 associated with the agent 102 to update firmware. It is assumed that, at the start of the processing sequence, the agent 102 has not cached data needed to update firmware for the device 104. Additionally, it is assumed that firmware program information used to update the firmware for the device 104 is registered in a firmware management unit 601 of the manager 101. Additionally, the IP addresses of the manager 101 and the agent 102 are respectively assumed to be "192.168.10.00" and "192.168.10.200".

First, the manager 101 transmits, to the HTTP/HTTPS server 311 of the agent 102, a request including an instruction to the device 104 to update the firmware (S701). Here, the instruction includes a URL 702 (e.g., "https://192.168.10.100/api/firmware/update") for allowing the device 104 to start updating the firmware.

In response to receipt of a request from the manager 101, the HTTP/HTTPS server 311 of the agent 102 invokes the task execution unit 310 to execute the requested processing. The task execution unit 310 transmits, to the device 104, a firmware update request including the URL 702 included in the request (S703).

In response to receipt of the firmware update request from the agent 102, the device 104 transmits, to the URL 702 included in the request, an HTTP/HTTPS request including the product information regarding the device and the version information regarding the firmware (S704). This causes the device 104 to start update processing the firmware.

In response to receipt of the request from the device 104, the HTTP/HTTPS server 304 of the manager 101 starts firmware update processing executed by the firmware management unit 601. The firmware management unit 601 determines the data needed to update the firmware based on the product information and the version information regarding the firmware for the device 104, both pieces of information being included in the request. Then, the firmware management unit 601 creates a URL (e.g., "https://192.168.10.100/public/firmwares/ca071592-3a64-4c88-9013-cd28a73a7901") for allowing the device 104 to obtain the data needed to update the firmware. Furthermore, the firmware management unit 601 identifies the agent 102 with which the device 104 is associated via the device management unit 302. Furthermore, the firmware management unit 601 obtains the address of the agent 102 via the agent management unit 301 and replaces the URL with a URL 706 for the cache of the agent 102. The URL 706 is, for example, "https://192.168.10.200/cache/firmwares/ca071592-3a64-4c88-9013-cd28a73a7901". Here, in a case where the manager 101 and the agent 102 are operating in the same information processing apparatus, the above-described replacement is not performed. The case of operating in the same information processing apparatus corresponds to a case where, i.e., the host address portion of the URL (corresponding to the IP address portion of the URL described above) is the same as the address of the host on which the agent 102 operates.

In response to the request from the device 104 in S704, the HTTP/HTTPS server 304 of the manager 101 replies with a response that includes the created URL 706 (S705).

In response to receipt of the response from the manager 101, the device 104 transmits, to the URL 706 included in the response, a request for obtainment of data needed to update the firmware (S707).

In response to receipt of the request from the device 104, the HTTP/HTTPS server 311 of the agent 102 invokes the data obtainment process illustrated in FIG. 4. Because the subsequent processing is similar to the processing in and after S506 in FIG. 5A described in the first embodiment, description of the processing is omitted.

After the present processing sequence, the device 104 executes update processing on the firmware for the device 104 using the data 709 received in S711. Then, the present processing sequence is terminated.

Post-Cache

FIG. 7B is a sequence diagram illustrating a flow of processing executed in a case where, after the processing in FIG. 7A, the manager 101 instructs the device 105 associated with the agent 102 to update the firmware. Here, the device 105 is assumed to be the same product as the device 104 and have the same firmware version such as that for the device 104, for which the processing in FIG. 7A has not been started yet. In other words, the update processing includes updating the firmware of the same version for the same product, and thus the data 709 needed for the update is the same such as that illustrated in FIG. 7A. At the start of the present processing sequence, the agent 102 is caching the data 709 needed to update the firmware for the device 105 as a result of the processing illustrated in FIG. 7A.

Processing from S720 to S723 is similar to S701 to S704 in FIG. 7A, and thus description of the processing is omitted.

In response to receipt of a response from the manager, the device 105 transmits, to the URL 706 included in the response, a request for obtainment of data needed to update the firmware (S724).

In response to the data obtainment request from the device 105, the agent 102 replies with the data 709 held in the cache (S725).

After the present processing sequence, the device 105 executes update processing on the firmware for the device 105 using the data 709 received in S725. Then, the present processing sequence is terminated.

As described above, in the present embodiment, in a case where the software to be installed in the device is firmware, the differential file needed for the update is cached. This enables avoidance of concentration of accesses on the manager to lighten the burden on the manager when firmware is obtained.

Note that, in the present embodiment, the firmware is described as an example of the software to be updated but that the present invention is not limited to the firmware. For example, similar processing can be executed on other programs as long as the program can be performed version management or management and handling regarding differential data.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-163276, filed Sep. 6, 2019, which is hereby incorporated by reference herein in its entirety.

What is claimed is:

1. A management system comprising a manager configured to manage software and an agent configured to communicate with one or more devices via a network based on an instruction from the manager, wherein
the manager comprises:
an instruction unit configured to give the agent an instruction to transmit, to a device, location information for obtaining software, and
the agent comprises:
a transmission unit configured to transmit the location information to the device based on the instruction from the manager;
a cache unit configured to cache the software;
a determination unit configured to determine, when an obtainment request for the software is received from the device, whether the software corresponding to the location information indicated in the obtainment request is cached in the cache unit or not;
a first distribution unit configured to distribute, in a case where the determination unit determines that the software is cached, the software cached in the cache unit to the device; and
a second distribution unit configured to obtain, in a case where the determination unit determines that the software is not cached, the software based on the location information indicated in the obtainment request, cause the cache unit to cache the software, and distribute the software to the device.

2. The management system according to claim 1, wherein the software is firmware or an application installed on the device.

3. The management system according to claim 1, wherein, when transmitting the location information to the device, the transmission unit converts the location information indicated in the instruction from the manager into location information corresponding to the cache unit and transmits.

4. The management system according to claim 1, wherein the instruction unit specifies location information corresponding to the cache unit of the agent as location information for obtaining the software, and
in a case where the determination unit determines that the software is not cached, the second distribution unit requests the software to the manager based on the location information.

5. The management system according to claim 1, wherein, in a case where the manager and the agent are operating in an identical information processing apparatus, no caching is performed by the cache unit of the agent.

6. The management system according to claim 1, wherein the cache unit deletes software that has been cached for a certain amount of time.

7. A control method for a management system comprising a manager configured to manage software and an agent configured to communicate with one or more devices via a network based on an instruction from the manager, the control method comprising:
giving, by the manager, the agent an instruction to transmit, to a device, location information for obtaining software;
transmitting, by the agent, the location information to the device based on the instruction from the manager;
determining, by the agent, when an obtainment request for the software being received from the device, whether the software corresponding to the location information indicated in the obtainment request being cached in a cache unit or not;
distributing, by the agent, in a case where the software being determined to be cached, the software cached in the cache unit to the device; and
obtaining, by the agent, in a case where the software being determined not to be cached, the software based on the location information indicated in the obtainment request, causing the cache unit to cache the software, and distributing the software to the device.

8. A non-transitory computer-readable recording medium storing a program that causes a computer, configured to function as an agent configured to communicate with one or more devices over a network based on an instruction from a manager configured to manage software, to function as:
a transmission unit configured to transmit location information for obtaining software to a device based on the instruction from the manager;
a cache unit configured to cache the software in a storage area;
a determination unit configured to determine, when an obtainment request for the software being received from the device, whether the software corresponding to the location information indicated in the obtainment request being cached in the storage area or not;
a first distribution unit configured to distribute, in a case where the determination unit determining that the software being cached, the software cached in the storage area to the device; and
a second distribution unit configured to obtain, in a case where the determination unit determining that the software not being cached, the software based on the location information indicated in the obtainment request, cause the cache unit to cache the software in the storage area, and distribute the software to the device.

* * * * *